(12) United States Patent
Rogers (10) Patent No.: US 7,097,361 B2
(45) Date of Patent: Aug. 29, 2006

(54) ROD END DEVICE FOR A MOTOR VEHICLE

(76) Inventor: James Rogers, 5816 U.S. 20 West, Freeport, IL (US) 61032

(*) Notice: Subject to any disclaimer, the term of this patent is extended or adjusted under 35 U.S.C. 154(b) by 0 days.

(21) Appl. No.: 10/724,003

(22) Filed: Nov. 26, 2003

(65) Prior Publication Data
US 2005/0002592 A1    Jan. 6, 2005

(51) Int. Cl.
*F16C 23/04* (2006.01)

(52) U.S. Cl. .................................. 384/213

(58) Field of Classification Search ............. 384/213, 384/206, 208, 209, 214
See application file for complete search history.

(56) References Cited

U.S. PATENT DOCUMENTS

| | | | | |
|---|---|---|---|---|
| 2,766,079 A | * | 10/1956 | Browne | 384/209 |
| 3,685,878 A | * | 8/1972 | Orkin | 384/213 |
| 3,947,077 A | * | 3/1976 | Berg et al. | 384/147 |
| 5,405,200 A | * | 4/1995 | Sumiyoshi et al. | 384/208 |

* cited by examiner

*Primary Examiner*—Lenard A. Footland
(74) *Attorney, Agent, or Firm*—David J. Archer (57) ABSTRACT

A rod end device is disclosed for a motor vehicle. The device includes a ball having an outer surface, the ball defining a supporting bore that extends through the ball. A race is provided for bearingly supporting the ball, the race defining a groove which is in fluid communication with the outer surface of the ball. A rod end supports the race, the rod end defining a channel which is in fluid communication with the groove. A one way valve is connected to the channel for supplying lubricant to the channel.

16 Claims, 10 Drawing Sheets

ROD END DEVICE FOR A MOTOR VEHICLE

BACKGROUND OF THE INVENTION

1. Field of the Invention

The present invention relates to a rod end device for a motor vehicle. More specifically, the present invention relates to a rod end device for a motor vehicle in which a ball is rotatably anchored within a race.

2. Background Information

A rod end is used in racing cars and other motor vehicle for connecting a wheel of such vehicle to a steering arm or the like. A typical rod end will include a rod which terminates at both ends with a socket for the receipt therein of a ball swivel which is anchored to the backplate or like of the wheel to be steered.

When manufactured, such rod ends are preloaded with lubricant or grease in order to permit movement of the ball within the corresponding socket. However, there is a strong tendency during use of the vehicle for such lubricant to become depleted. Such lack of lubrication causes premature wear and ultimately the failure of such prior art rod ends. During racing, the failure of a rod end will require a pit stop for the replacement of such worn rod end and such repairs can be extremely time consuming.

The rod end device according to the present invention overcomes the aforementioned problem associated with the prior art devices by the provision of means for supplying lubricant under pressure, to the ball and socket of the rod end subsequent to the manufacture of the rod end.

Therefore, it is a primary feature of the present invention to provide a rod end device for a motor vehicle that overcomes the problems associated with the prior art arrangements.

Another feature of the present invention is the provision of a rod end device for a motor vehicle that facilitates the lubrication of the socket.

A further feature of the present invention is the provision of a rod end device for a motor vehicle that permits lubrication of the socket subsequent to assembly.

Another feature of the present invention is the provision of a rod end device for a motor vehicle that increases the life of the rod end.

Other features and advantages of the present invention will be readily apparent to those skilled in the art by a consideration of the detailed description of a preferred embodiment of the present invention contained herein.

SUMMARY OF THE INVENTION

The present invention relates to a rod end device for a motor vehicle. The device includes a ball having an outer surface, the ball defining a supporting bore that extends through the ball. A race is provided for bearingly supporting the ball, the race defining a groove which is in fluid communication with the outer surface of the ball. A rod end supports the race, the rod end defining a channel which is in fluid communication with the groove. A one way valve is connected to the channel for supplying lubricant to the channel.

In a more specific embodiment of the present invention, the ball is fabricated from steel.

Also, the ball is of generally spherical configuration, the ball having a longitudinal axis which extends therethrough. The ball defines a planar surface formed by the removal from the ball of an end cap through which the longitudinal axis extends. Additionally, the ball defines a further planar surface which is disposed diametrically opposite relative to the planar surface, the further planar surface being formed by the removal from the ball of a further end cap through which the longitudinal axis extends.

Moreover, the supporting bore is of cylindrical configuration, the supporting bore having a longitudinally extending axis which coextends with the longitudinal axis of the ball.

Preferably, the race is fabricated from bronze and the race defines a socket cavity for the rotatable reception therein of the ball.

The socket cavity and the outer surface of the ball define therebetween a clearance which permits rotation of the ball within the socket cavity. Such clearance is also provided for the application therein of a thin film of the lubricant.

Additionally, the groove of the race includes an inlet portion and an annular portion which extends from the inlet portion. The annular portion extends around the outer surface of the ball, the annular portion permitting the lubricant to flow from the inlet portion to the outer surface of the ball.

Furthermore, the rod end includes a pipe having a first and a second end. The pipe defines the channel which has a first and a second extremity. The first end of the pipe is fastened to the race such that the first extremity of the pipe is in fluid communication with the race and with the annular portion of the race.

More specifically, the first end of the pipe defines an eye for the rigid reception therein of the race such that when the race is disposed within the eye, the inlet portion is aligned relative to the first extremity of the channel such that lubricant within the channel flows through the first extremity of the channel through the inlet portion and around the annular portion for lubricating the outer surface of the ball.

Also, in another aspect of the present invention, the one way valve is sealingly disposed adjacent to the second end of the pipe for supplying the lubricant to the channel.

The device also includes a tube having a first and a second end, the tube defining a cavity which extends between the first end and the second end of the tube. The first end of the tube sealingly cooperates with the rod end such that the cavity is disposed in fluid communication with the channel so that a flow of lubricant disposed within the cavity to the outer surface of the ball is permitted.

Additionally, the device includes a plug which is disposed within the cavity for inhibiting flow of the lubricant from the second end of the tube.

More particularly, the one way valve is disposed between the plug and the first end of the tube for supplying the lubricant to the cavity.

In another aspect of the present invention, a rod end device for a motor vehicle includes a ball having an outer surface, the ball defining a supporting bore that extends through the ball. A race is provided for bearingly supporting the ball, the race defining a groove which is in fluid communication with the outer surface of the ball. A rod end is included for supporting the race, the rod end defining a channel which is in fluid communication with the groove. A tube has a first and a second end, the tube defining a cavity which extends between the first end and the second end of the tube. The first end of the tube sealingly cooperates with the rod end such that the cavity is disposed in fluid communication with the channel. The arrangement is such that a flow of lubricant disposed within the cavity to the outer surface of the ball is permitted. A plug is disposed within the cavity for inhibiting flow of the lubricant from the second end of the tube. Also, a one way valve is connected to the channel for supplying the lubricant to the channel.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various views and embodiments of the drawings.

DETAILED DESCRIPTION OF THE DRAWINGS

Figure 1:
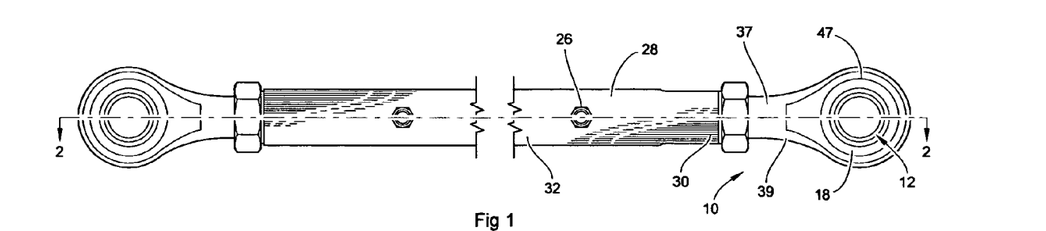
FIG. 1 is a side elevational view of the rod end device according to the present invention.

FIG. 1 is a side elevational view of a rod end device according to the present invention. As shown in FIG. 1, a rod end device generally designated 10 for a motor vehicle includes a ball generally designated 12.

Figure 2:
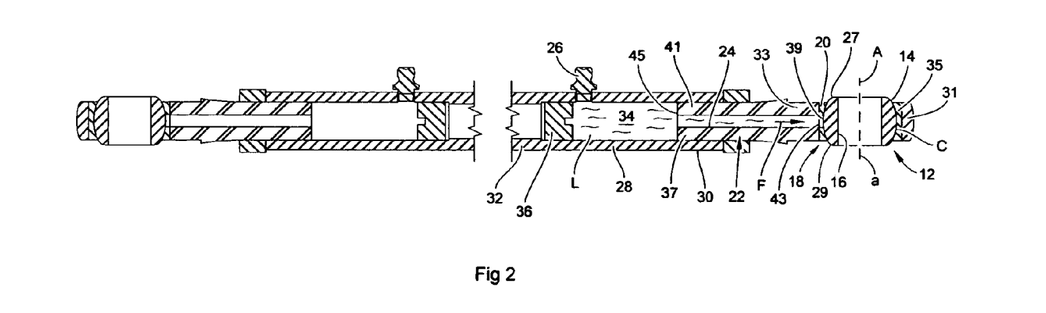
FIG. 2 is a sectional view taken on the line 2—2 of FIG. 1.

FIG. 2 is a sectional view taken on the line 2—2 of FIG. 1. As shown in FIG. 2, the ball 12 has an outer surface 14, the ball 12 defining a supporting bore 16 that extends through the ball 12. A race generally designated 18 is provided for bearingly supporting the ball 12, the race 18 defining a groove generally designated 20 which is in fluid communication with the outer surface 14 of the ball 12. A rod end generally designated 22 supports the race 18, the rod end 22 defining a channel 24 which is in fluid communication with the groove 20. A one way valve 26 is connected to the channel 24 for supplying lubricant L to the channel 24.

In a more specific embodiment of the present invention, the ball 12 is fabricated from steel.

Also, the ball 12 is of generally spherical configuration, the ball 12 having a longitudinal axis A which extends therethrough. The ball 12 defines a planar surface 27 formed by the removal from the ball 12 of an end cap (not shown) through which the longitudinal axis A extends. Additionally, the ball 12 defines a further planar surface 29 which is disposed diametrically opposite relative to the planar surface 27, the further planar surface 29 being formed by the removal from the ball 12 of a further end cap (not shown) through which the longitudinal axis A extends.

Moreover, the supporting bore 16 is of cylindrical configuration, the supporting bore 16 having a longitudinally extending axis a which coextends with the longitudinal axis A of the ball 12.

Preferably, the race 18 is fabricated from bronze or NYLON and the race 18 defines a socket cavity 31 for the rotatable reception therein of the ball 12.

The socket cavity 31 and the outer surface 14 of the ball 12 define therebetween a clearance C which permits rotation of the ball 12 within the socket cavity 31. Such clearance C is also provided for the application thereto of a thin film of the lubricant L.

Additionally, the groove 20 of the race 18 includes an inlet portion 33 and an annular portion 35 which extends from the inlet portion 33. The annular portion 35 extends around the outer surface 14 of the ball 12, the annular portion 35 permitting the lubricant to flow as indicated by the arrow F from the inlet portion 33 to the outer surface 14 of the ball 12.

Furthermore, the rod end 22 includes a pipe 37 having a first and a second end 39 and 41 respectively. The pipe 37 defines the channel 24 which has a first and a second extremity 43 and 45 respectively. The first end 39 of the pipe 37 is fastened to the race 18 such that the first extremity 43 of the channel 24 is in fluid communication with the race 18 and with the annular portion 35 of the race 18.

More specifically, as shown in FIG. 1, the first end 39 of the pipe 37 defines an eye 47 for the rigid reception therein of the race 18. The arrangement is such that when the race 18 is disposed within the eye 47, the inlet portion 33 is aligned relative to the first extremity 43 of the channel 24 such that lubricant L within the channel 24 flows as indicated by the arrow F through the first extremity 43 of the channel 24 through the inlet portion 33 and around the annular portion 35 for lubricating the outer surface 14 of the ball 12.

As shown in FIGS. 1 and 2, the device 10 also includes a tube 28 having a first and a second end 30 and 32 respectively. The tube 28 defines a cavity 34 which extends between the first end 30 and the second end 32 of the tube 28. The first end 30 of the tube 28 sealingly cooperates with the rod end 22 such that the cavity 34 is disposed in fluid communication with the channel 24 so that the flow of lubricant F disposed within the cavity 34 to the outer surface 14 of the ball 12 is permitted.

Figure 3:
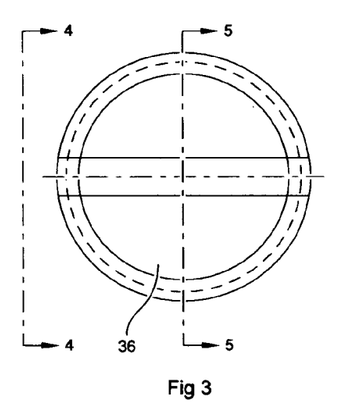
FIG. 3 is an enlarged view of the plug shown in FIG. 2.

FIG. 3 is an enlarged view of a plug shown in FIG. 2. As shown in FIGS. 3 and 2, a plug 36 is disposed within the cavity 34 for inhibiting flow of the lubricant L from the second end 32 of the tube 28.

Figure 4:
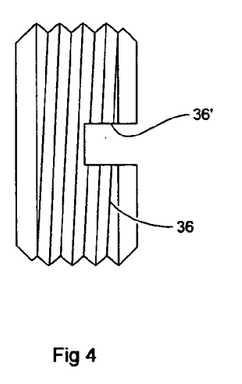
FIG. 4 is a view taken on the line 4—4 of FIG. 3.

FIG. 4 is a view taken on the line 4—4 of FIG. 3. As shown in FIG. 4, the plug 36 is externally threaded so that the plug can be threaded into a correspondingly threaded portion of the second end 32 of the tube 28.

Figure 5:
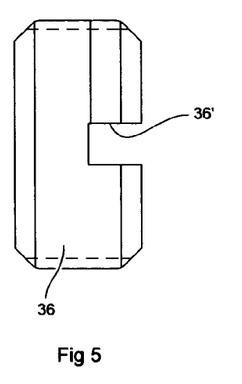
FIG. 5 is a sectional view taken on the line 5—5 of FIG. 3.

FIG. 5 is a sectional view taken on the line 5—5 of FIG. 3. As shown in FIG. 5, the plug 36 is provided with a slot 36' for enabling the plug 36 to be screwed into the second end 32 of the tube 28.

As shown in FIGS. 1–2, the one way valve 26 is disposed between the plug 36 and the first end 30 of the tube 28 for supplying the lubricant L to the cavity 34.

Figure 6:
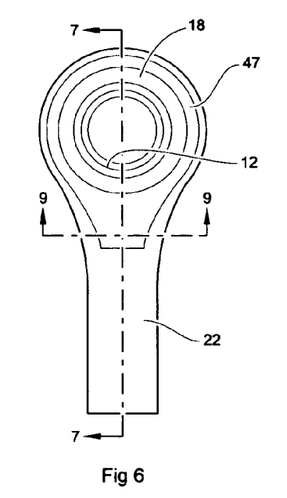
FIG. 6 is a side elevational view of the rod end of the device shown in FIG. 1.

FIG. 6 is a side elevational view of the rod end of the device shown in FIG. 1. As shown in FIG. 6, the rod end 22 defines the eye 47 for the reception therein of the race 18 for holding the ball 12.

Figure 7:
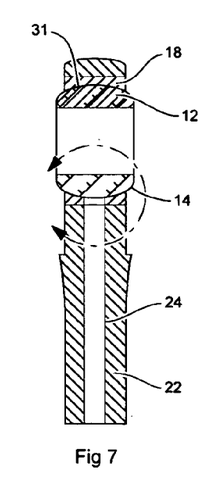
FIG. 7 is a sectional view taken on the line 7—7 of FIG. 6.

FIG. 7 is a sectional view taken on the line 7—7 of FIG. 6. As shown in FIG. 7, the ball 12 is permitted to float within the socket cavity 31 of the race 18.

Figure 8:
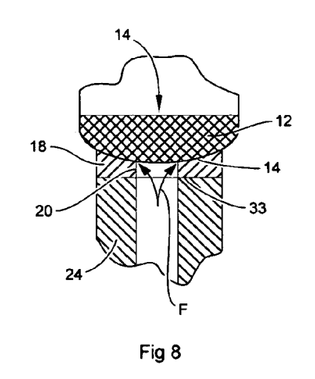
FIG. 8 is an enlarged fragmentary view of the race and ball shown in FIG. 7.

FIG. 8 is an enlarged fragmentary view of the race 18 and ball 12 shown in FIG. 7. As shown in FIG. 8, the inlet portion 33 permits a flow F of lubricant L to the outer surface 14 of the ball 12.

Figure 9:
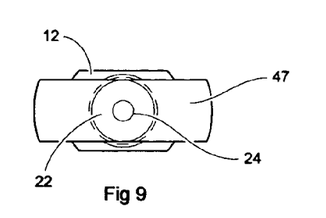
FIG. 9 is a sectional view taken on the line 9—9 of FIG. 6.

FIG. 9 is a sectional view taken on the line 9—9 of FIG. 6. As shown in FIG. 9, the channel 24 permits the lubricant L to flow to the outer surface 14 of the ball 12.

Figure 10:
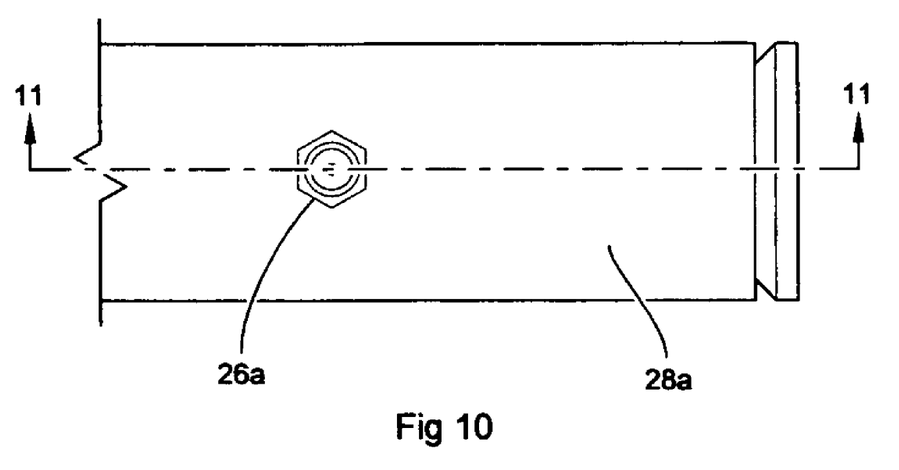
FIG. 10 is a fragmentary side elevational view of a tube and one way valve according to another embodiment of the present invention.

FIG. 10 is a fragmentary side elevational view of a tube and one way valve according to another embodiment of the present invention. As shown in FIG. 10, a tube 28a has a one way valve 26a extending therethrough.

Figure 11:
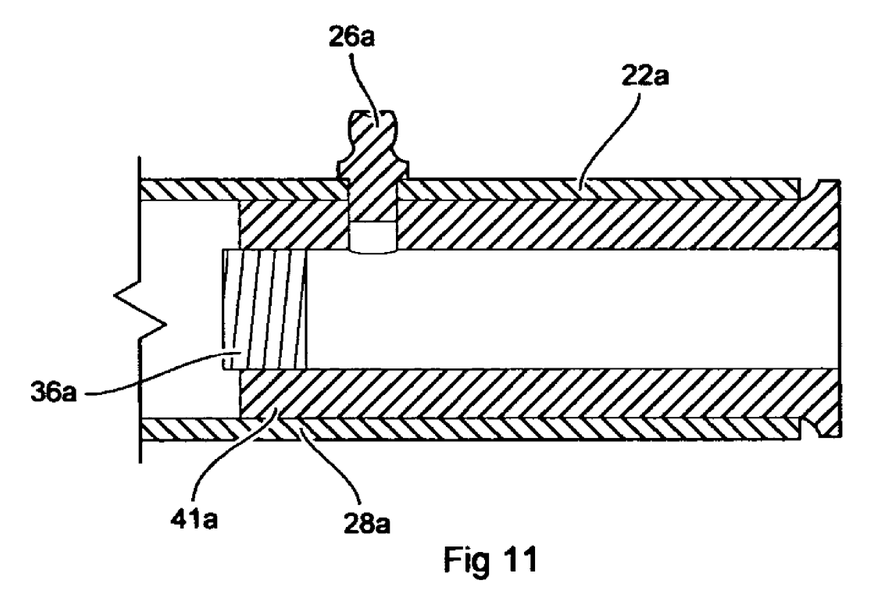
FIG. 11 is a sectional view taken on the line 11—11 of FIG. 10.

FIG. 11 is a sectional view taken on the line 11—11 of FIG. 10. As shown in FIG. 11, the one way valve 26a extends through the tube 28a and through a pipe 22a which is secured within the tube 28a. A plug 36a is screwed into the second end 41a of the pipe 22a for sealing the second end 41a of the pipe 22a. In other respects, the ball and socket cavity and the race are the same as the arrangement shown in the embodiment shown in FIGS. 1–2.

Figure 12:
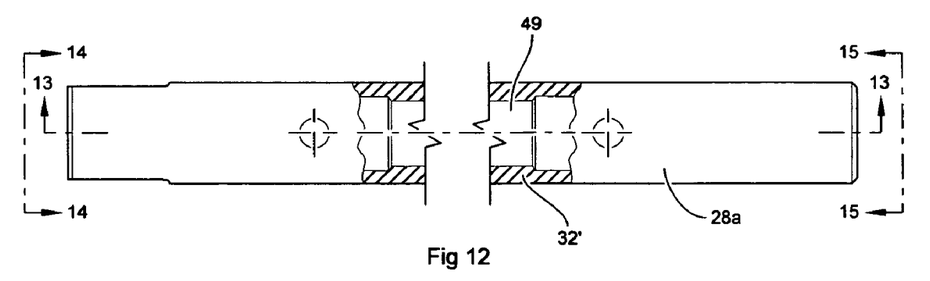
FIG. 12 is a side elevational view, partially in section, of another embodiment of the present invention.

FIG. 12 is a side elevational view, partially in section, of another embodiment of the present invention. As shown in FIG. 12, the second end 32' of the tube 28a is sealed by a block 49.

Figure 13:
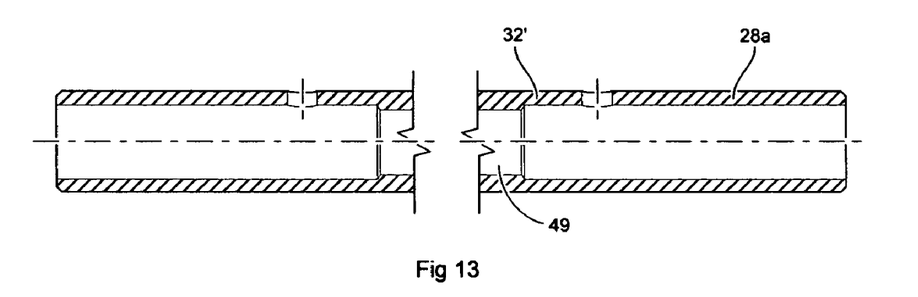
FIG. 13 is a sectional view taken on the line 13—13 of FIG. 12.

FIG. 13 is a sectional view taken on the line 13—13 of FIG. 12. As shown in FIG. 13, the block 49 prevents a backflow of lubricant through the second end 32' of the tube 28a.

Figure 14:
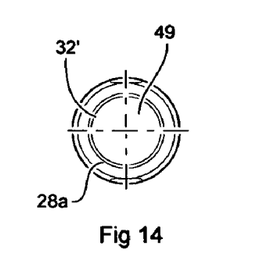
FIG. 14 is a view taken on the line 14—14 of FIG. 12.

FIG. 14 is a view taken on the line 14—14 of FIG. 12. As shown in FIG. 14, the second end 32' of the tube 28a is constricted for the receipt therein of the block 49.

Figure 15:
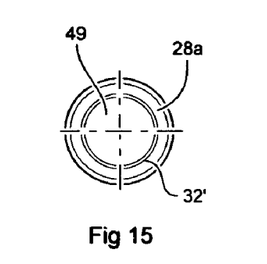
FIG. 15 is a view taken on the line 15—15 of FIG. 12.

FIG. 15 is a view taken on the line 15—15 of FIG. 12. As shown in FIG. 15, the second end 32' of the tube 28a is constricted for the receipt therein of the block 49.

Figure 16:
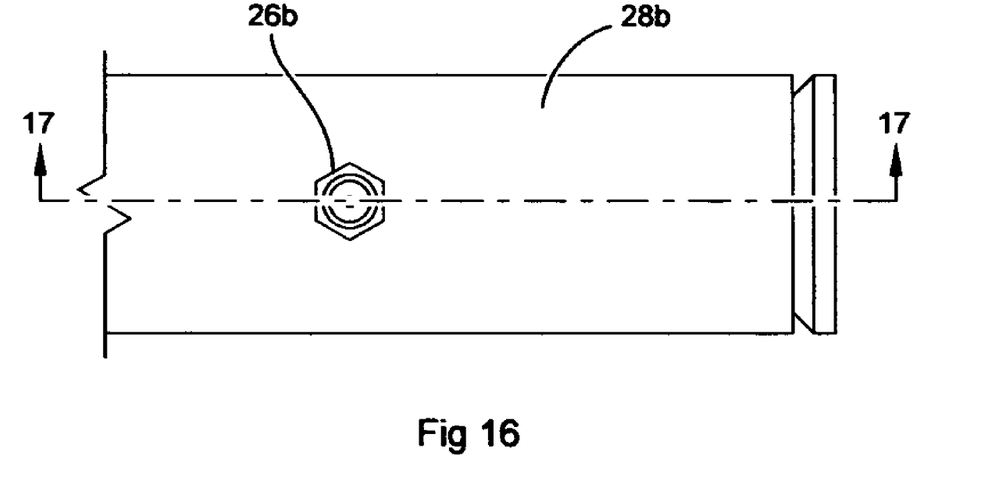
FIG. 16 is a side elevational view of a further embodiment of the present invention.

FIG. 16 is a side elevational view of a further embodiment of the present invention. As shown in FIG. 16, a tube 28b has a one way valve 26b extending therethrough.

Figure 17:
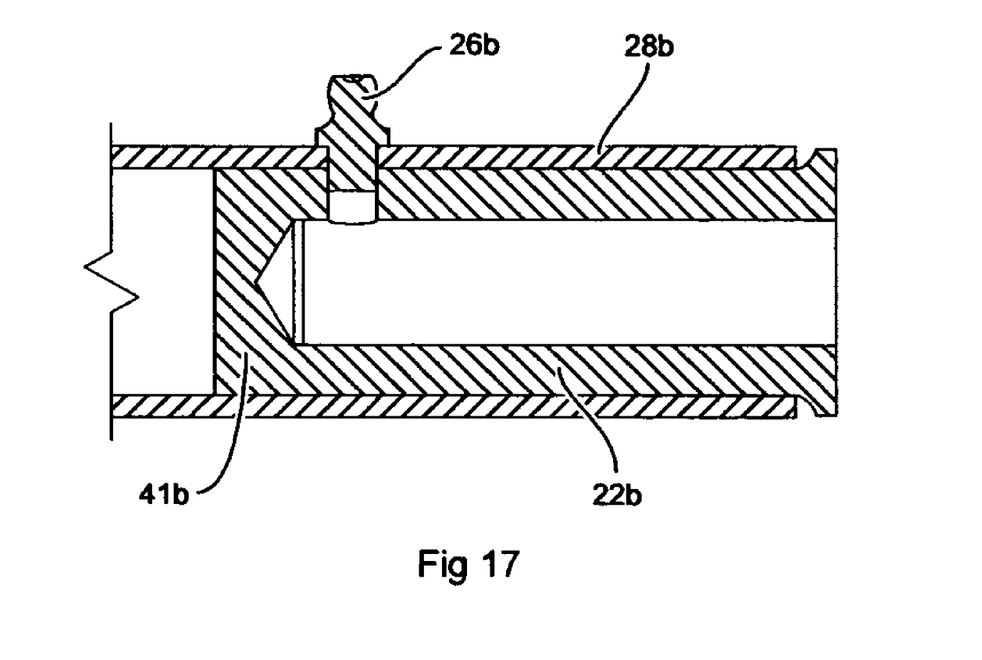
FIG. 17 is a sectional view taken on the line 17—17 of FIG. 16.

FIG. 17 is a sectional view taken on the line 17—17 of FIG. 16. As shown in FIG. 17, the arrangement is similar to that shown in FIG. 11. However, instead of a plug, the second end 41b of the pipe 22b is closed.

Figure 18:
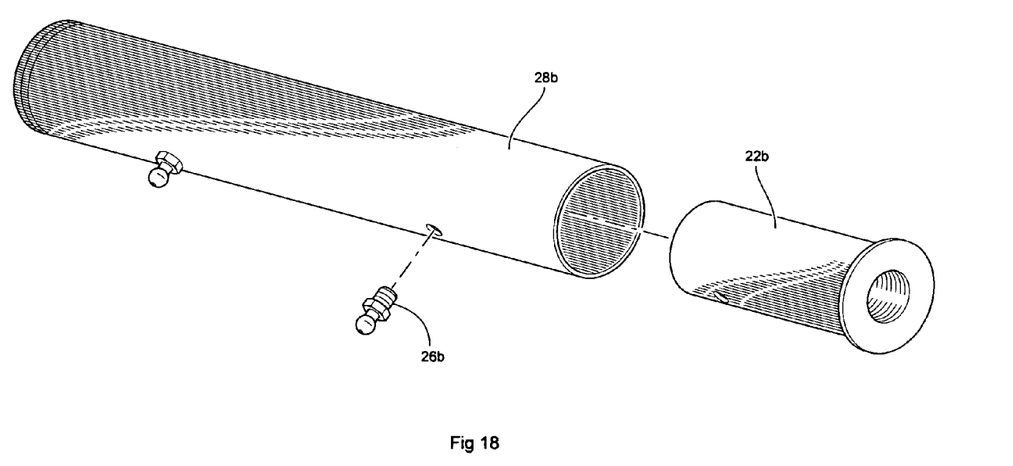
FIG. 18 is a perspective view of the embodiment shown in FIG. 16.

FIG. 18 is a perspective view of the embodiment shown in FIG. 16. As shown in FIG. 18, the pipe 22b is secured within the tube 28b by means of the one way valve 26b.

Figure 19:
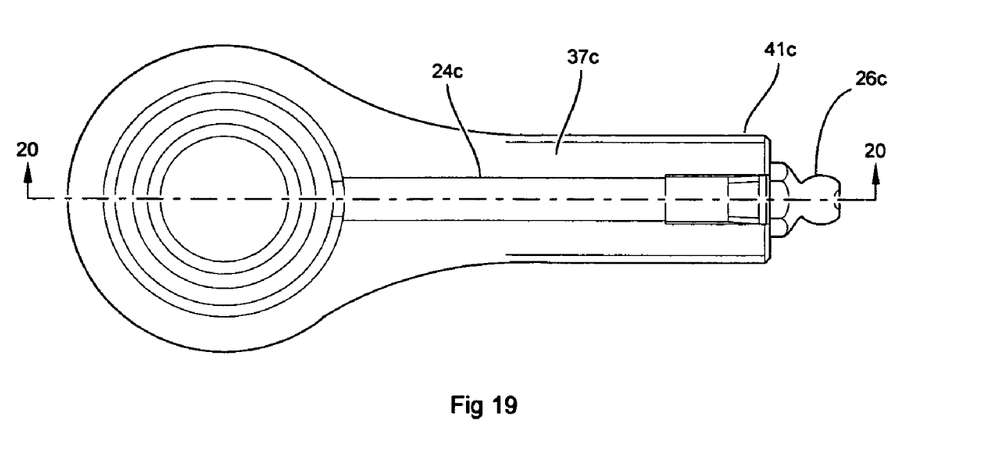
FIG. 19 is a side elevational view of yet a further embodiment of the present invention.

FIG. 19 is a side elevational view of yet a further embodiment of the present invention. As shown in FIG. 19, a one way valve 26c is sealingly disposed adjacent to the second end 41c of the pipe 37c for supplying lubricant to the channel 24c.

Figure 20:
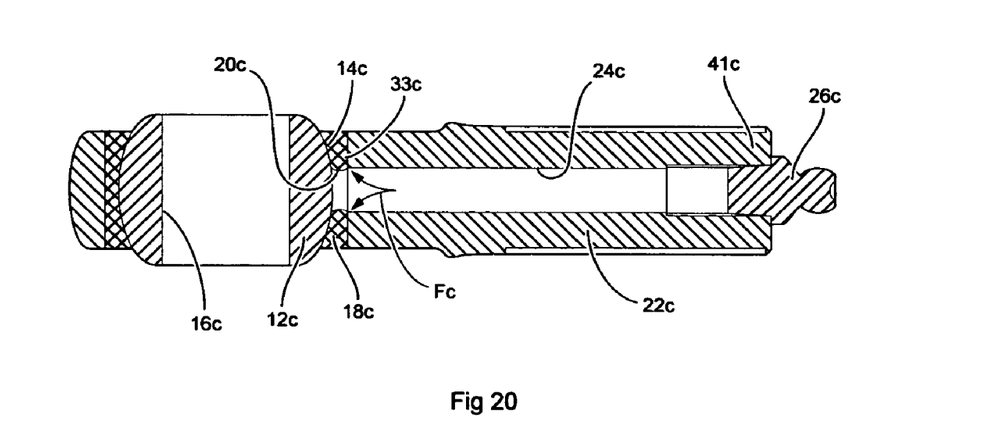
FIG. 20 is a sectional view taken on the line 20—20 of FIG. 19.

FIG. 20 is a sectional view taken on the line 20—20 of FIG. 19.

Figure 21:
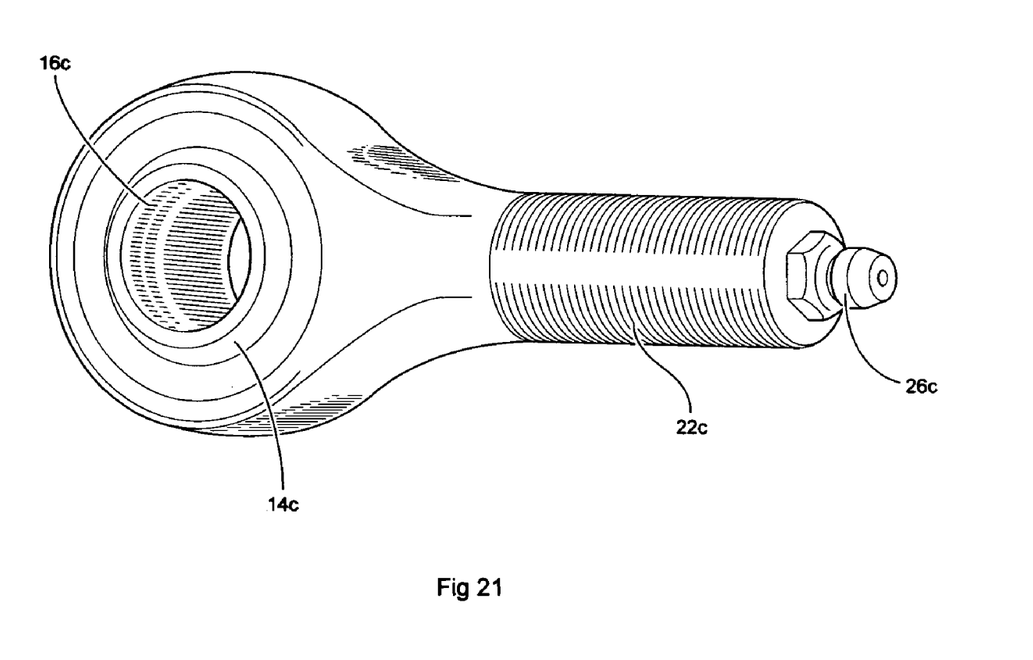
FIG. 21 is a perspective view of the embodiment shown in FIG. 20.
Figure 22:
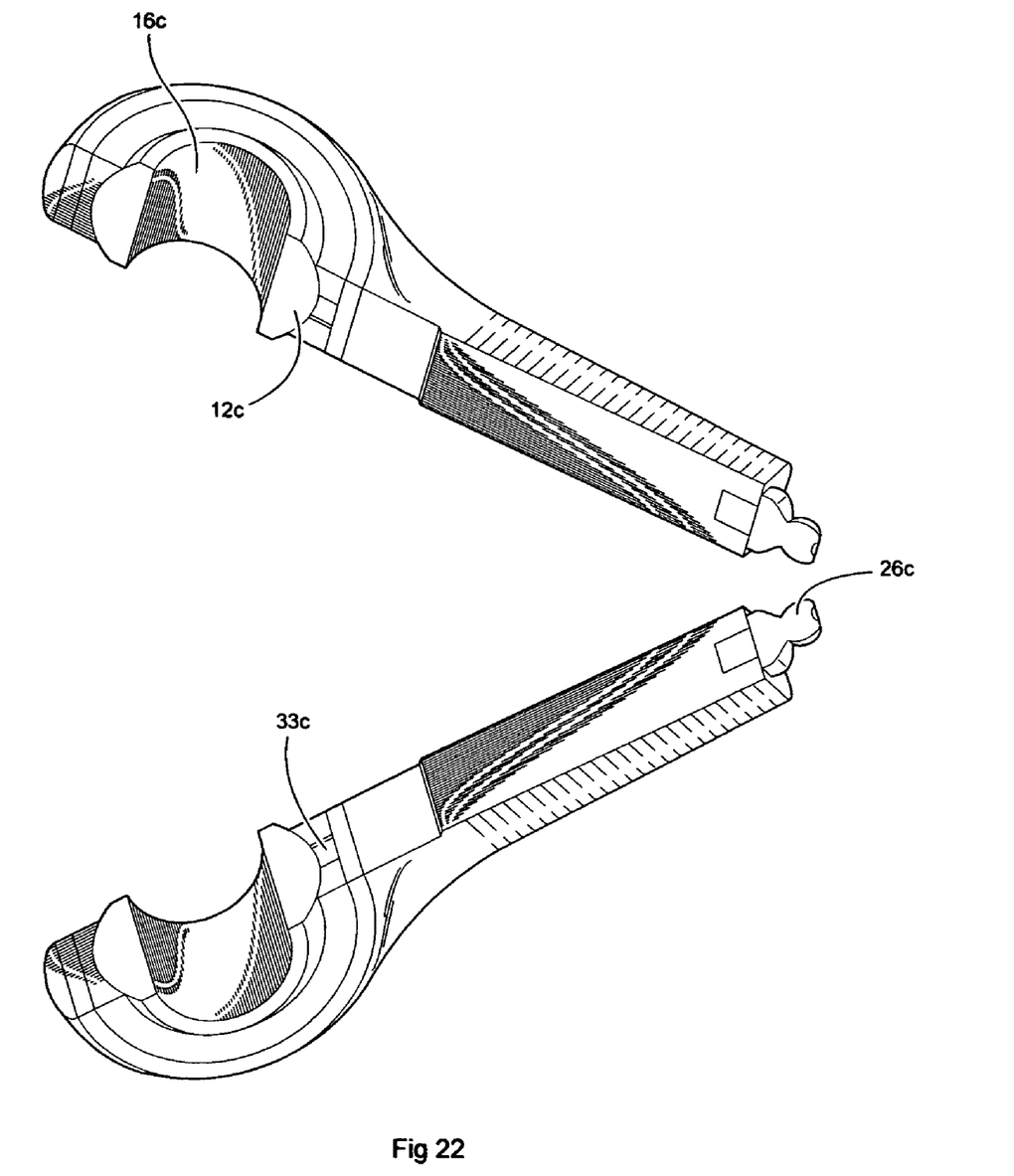
FIG. 22 is a perspective view of the device shown in FIG. 21 but with the device cut through to show the relative disposition of the parts thereof.

FIG. 21 is a perspective view of the embodiment shown in FIG. 20 and FIG. 22 is a perspective view of the device shown in FIG. 21 but with the device cut through to show the relative disposition of the parts thereof. As shown in FIGS. 19–22, lubricant flows as shown by the arrow Fc from the one way valve 26c through the channel 24c through the inlet portion 33c of the race 18c for lubricating the outer surface 14c of the ball 12c.

The arrangement of FIGS. 19–22 provides a removable pipe 22c for permitting pressure lubrication through the one way valve 26c. After lubrication, the second end 41c of the pipe 22c is inserted into the first end 30 of the tube 28 (not shown).

The present invention includes a groove 20 which in one arrangement extends from the first extremity 43 of the channel 24 through the race 18 as far as the surface 14 of the ball 12. In another arrangement, the groove also includes an annular portion 35 which extends all the way around the ball 12 for guiding the lubricant circumferentially around the surface 14 of the ball 12.

In operation of the device according to the present invention, the race 18 is drilled to provide the inlet portion 33 and the pipe 37 is fastened to the tube 28 with the second end 41 of the pipe 37 inserted into the first end 30 of the tube 28, the second end 32 of the tube 28 having been previously sealed by the plug 36. Lubricant L is pressure fed through the one way valve 26 so that lubricant L flows as indicated by the arrow F through the inlet portion 33 to lubricate the outer surface 14 of the ball 12.

The present invention provides a unique rod end device for a motor vehicle which increases the life thereof and which facilitates lubrication thereof.

What is claimed is:

1. A rod end device for a motor vehicle, said device comprising:
    a ball having an outer surface, said ball defining a supporting bore that extends through said ball;
    a race for bearingly supporting said ball, said race defining a groove which is in fluid communication with said outer surface of said ball;
    a rod end for supporting said race, said rod end defining a channel which is in fluid communication with said groove;
    a tube having a first and a second end, said tube defining a cavity which extends between said first end and said second end of said tube, said first end of said tube sealingly cooperating with said rod end such that said cavity is disposed in fluid communication with said channel so that a flow of lubricant disposed within said cavity to said outer surface of said ball is permitted;
    a plug disposed within said cavity for inhibiting flow of the lubricant from said second end of said tube; and
    a one way valve connected to said channel for supplying the lubricant to said channel.

2. A rod end device as set forth in claim 1 wherein said ball is fabricated from steel.

3. A rod end device as set forth in claim 1 wherein said ball is of generally spherical configuration, said ball having a longitudinal axis extending therethrough, said ball defining a planar surface formed by the removal from the ball of an end cap through which said longitudinal axis extends, said ball defining a further planar surface disposed diametrically opposite relative to said planar surface, said further planar surface being formed by the removal from the ball of a further end cap through which said longitudinal axis extends.

4. A rod end device as set forth in claim 3 wherein said supporting bore is of cylindrical configuration, said supporting bore having a longitudinally extending axis coextending with said longitudinal axis of said ball.

5. A rod end device as set forth in claim 4 wherein said groove of said race includes:
an inlet portion;
an annular portion extending from said inlet portion, said annular portion extending around said outer surface of said ball, said annular portion permitting the lubricant to flow from said inlet portion to said outer surface of said ball, said annular portion being disposed coaxially relative to said supporting bore.

6. A rod end device as set forth in claim 1 wherein said race is fabricated from bronze.

7. A rod end device as set forth in claim 1 wherein said race defines a socket cavity for the rotatable reception therein of said ball.

8. A rod end device as set forth in claim 7 wherein said socket cavity and said outer surface of said ball define therebetween a clearance which permits rotation of said ball within said socket cavity and for the application thereto of a thin film of the lubricant.

9. A rod end device as set forth in claim 1 wherein said groove of said race includes:
an inlet portion;
an annular portion extending from said inlet portion, said annular portion extending around said outer surface of said ball, said annular portion permitting the lubricant to flow from said inlet portion to said outer surface of said ball.

10. A rod end device as set forth in claim 9 wherein said rod end includes:
a pipe having a first and a second end, said pipe defining said channel which has a first and a second extremity, said first end of said pipe being fastened to said race such that said first extremity of said pipe is in fluid communication with said annular portion of said race.

11. A rod end device as set forth in claim 10 wherein said first end of said pipe defines an eye for the rigid reception therein of said race such that when said race is disposed within said eye, said inlet portion is aligned relative to said first extremity of said channel such that lubricant within said channel flows through said first extremity of said channel through said inlet portion and around said annular portion for lubricating said outer surface of said ball.

12. A rod end device as set forth in claim 11 wherein said one way valve is sealingly disposed adjacent to said second end of said pipe for supplying the lubricant to said channel.

13. A rod end device as set forth in claim 1 wherein said rod end includes:
a pipe having a first and a second end, said pipe defining said channel which has a first and a second extremity, said first end of said pipe being fastened to said race such that said first extremity of said pipe is in fluid communication with said race.

14. A rod end device as set forth in claim 1 wherein said a plug is disposed within said cavity for inhibiting flow of the lubricant from said second end of said tube.

15. A rod end device as set forth in claim 14 wherein said one way valve is disposed between said plug and said first end of said tube for supplying the lubricant to said cavity.

16. A rod end device for a motor vehicle, said device comprising:
a ball having an outer surface, said ball defining a supporting bore that extends through said ball;
a race for bearingly supporting said ball, said race defining a groove which is in fluid communication with said outer surface of said ball;
a rod end for supporting said race, said rod end defining a channel which is in fluid communication with said groove;
a one way valve connected to said channel for supplying lubricant to said channel;
said ball being fabricated from steel;
said ball being of generally spherical configuration, said ball having a longitudinal axis extending therethrough, said ball defining a planar surface formed by the removal from the ball of an end cap through which said longitudinal axis extends, said ball defining a further planar surface disposed diametrically opposite relative to said planar surface, said further planar surface being formed by the removal from the ball of a further end cap through which said longitudinal axis extends;
said supporting bore being of cylindrical configuration, said supporting bore having a longitudinally extending axis coextending with said longitudinal axis of said ball;
said race being fabricated from bronze;
said race defining a socket cavity for the rotatable reception therein of said ball;
said socket cavity and said outer surface of said ball defining therebetween a clearance which permits rotation of said ball within said socket cavity and the application thereto of a thin film of the lubricant;
said groove of said race including:
an inlet portion;
an annular portion extending from said inlet portion, said annular portion extending around said outer surface of said ball, said annular portion permitting the lubricant to flow from said inlet portion to said outer surface of said ball, said annular portion being disposed coaxially relative to said supporting bore;
said rod end including:
a pipe having a first and a second end, said pipe defining said channel which has a first and a second extremity, said first end of said pipe being fastened to said race such that said first extremity of said pipe is in fluid communication with said annular portion of said race;
said first end of said pipe defining an eye for the rigid reception therein of said race such that when said race is disposed within said eye, said inlet portion is aligned relative to said first extremity of said channel such that lubricant within said channel flows through said first extremity of said channel through said inlet portion and around said annular portion for lubricating said outer surface of said ball;
said rod end device further including:
a tube having a first and a second end, said tube defining a cavity which extends between said first end and said second end of said tube, said first end of said tube sealingly cooperating with said rod end such that said cavity is disposed in fluid communication with said channel so that a flow of lubricant disposed within said cavity to said outer surface of said ball is permitted;
a plug disposed within said cavity for inhibiting flow of the lubricant from said second end of said tube; and
said one way valve being disposed between said plug and said first end of said tube for supplying the lubricant to said cavity.

* * * * *